(12) United States Patent
Branger

(10) Patent No.: US 8,973,931 B2
(45) Date of Patent: Mar. 10, 2015

(54) WHEEL STRUT FOR VEHICLE SUSPENSION

(71) Applicant: Eric Leonard Branger, Cologne (DE)

(72) Inventor: Eric Leonard Branger, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/729,558

(22) Filed: Dec. 28, 2012

(65) Prior Publication Data

US 2013/0200587 A1     Aug. 8, 2013

(30) Foreign Application Priority Data

Jan. 2, 2012 (DE) .......... 10 2012 200 001

(51) Int. Cl.
| | | |
|---|---|---|
| *B60G 3/02* | (2006.01) | |
| *B60G 11/20* | (2006.01) | |
| *F16C 27/06* | (2006.01) | |
| *B60G 7/02* | (2006.01) | |
| *B60G 15/04* | (2006.01) | |
| *F16C 33/02* | (2006.01) | |
| *B60G 7/00* | (2006.01) | |
| *F16F 1/38* | (2006.01) | |

(52) U.S. Cl.
CPC *B60G 7/02* (2013.01); *B60G 15/04* (2013.01); *F16C 33/02* (2013.01); *B60G 7/005* (2013.01); *F16F 1/3814* (2013.01); *F16F 1/3828* (2013.01); *B60G 2204/148* (2013.01); *B60G 2204/4104* (2013.01)
USPC ............... 280/124.13; 267/276; 280/86.758; 280/124.128; 280/124.134; 384/215

(58) Field of Classification Search
USPC ........... 267/273, 276, 279–282; 280/124.128, 280/124.13, 124.131, 124.134, 124.153, 280/124.166–124.169, 86.758; 384/215, 384/220, 222
See application file for complete search history.

(56) References Cited

U.S. PATENT DOCUMENTS

| | | | | |
|---|---|---|---|---|
| 1,913,513 | A * | 6/1933 | Rossman et al. .............. | 403/152 |
| 2,238,197 | A * | 4/1941 | Watson .......................... | 384/222 |
| 2,608,751 | A * | 9/1952 | Hutton ..................... | 29/898.055 |
| 2,824,751 | A * | 2/1958 | Wilfert ................... | 280/124.166 |
| 3,152,846 | A * | 10/1964 | Dumpis ....................... | 384/220 |
| 3,473,820 | A * | 10/1969 | Chaney ........................ | 280/676 |
| 4,273,356 | A * | 6/1981 | Sakata et al. ........... | 280/124.144 |
| 4,424,984 | A * | 1/1984 | Shiratori et al. ......... | 280/86.753 |
| 4,529,221 | A * | 7/1985 | Kijima et al. .......... | 280/124.128 |

(Continued)

FOREIGN PATENT DOCUMENTS

| | | |
|---|---|---|
| DE | 19722650 A1 | 1/1998 |
| EP | 1 216859 A2 | 6/2002 |

(Continued)

OTHER PUBLICATIONS

German Examination Report dated Sep. 21, 2012.

*Primary Examiner* — Ruth Ilan
*Assistant Examiner* — Laura Freedman
(74) *Attorney, Agent, or Firm* — Raymond L. Coppiellie; Brooks Kushman P.C.

(57) ABSTRACT

A vehicle suspension wheel strut, includes a first bushing; a wheel carrier journaled onto the first bushing; a first bracket at a first end of the first bushing; a second bracket at a second end of the first bushing; and identical damping elements positioned between the first bracket and wheel carrier at the first end of the first bushing and the second bracket and the wheel carrier at the second end of the first bushing.

17 Claims, 3 Drawing Sheets

(56) References Cited

U.S. PATENT DOCUMENTS

| | | | |
|---|---|---|---|
| 4,556,235 A | 12/1985 | Giebel | |
| 4,589,677 A * | 5/1986 | Matschinsky | 280/124.156 |
| 4,603,882 A | 8/1986 | Kijima et al. | |
| 4,634,108 A * | 1/1987 | Munch | 267/279 |
| 4,720,121 A * | 1/1988 | Kikuchi et al. | 280/124.128 |
| 4,848,788 A * | 7/1989 | Rumpel | 280/124.138 |
| 5,246,248 A | 9/1993 | Ferguson | |
| 5,503,376 A | 4/1996 | Simuttis et al. | |
| 5,899,431 A | 5/1999 | Lefol | |
| 6,099,005 A * | 8/2000 | Wakatsuki | 280/124.135 |
| 6,293,531 B1 * | 9/2001 | Kato et al. | 267/140.12 |
| 6,672,605 B2 * | 1/2004 | Basnett | 280/124.128 |
| 6,729,611 B2 * | 5/2004 | Deschaume et al. | 267/140.12 |
| 7,360,756 B2 * | 4/2008 | Urquidi et al. | 267/293 |
| 7,726,674 B2 * | 6/2010 | VanDenberg et al. | 280/124.128 |
| 7,789,406 B2 * | 9/2010 | Matsuoka | 280/124.135 |
| 8,181,945 B2 * | 5/2012 | Miyahara et al. | 267/140.12 |
| 2003/0111819 A1 * | 6/2003 | Bae | 280/124.177 |

FOREIGN PATENT DOCUMENTS

| | | |
|---|---|---|
| EP | 1 319534 A2 | 6/2003 |
| JP | 2006160008 | 6/2006 |

* cited by examiner

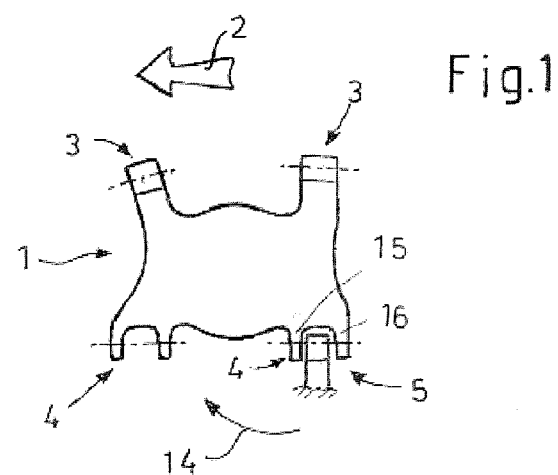
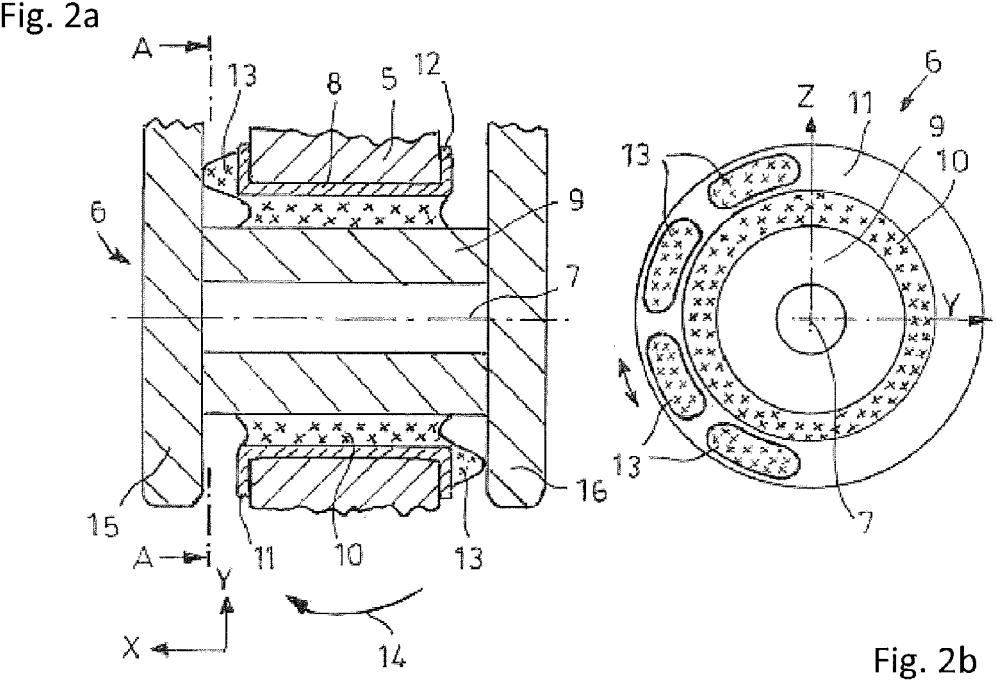

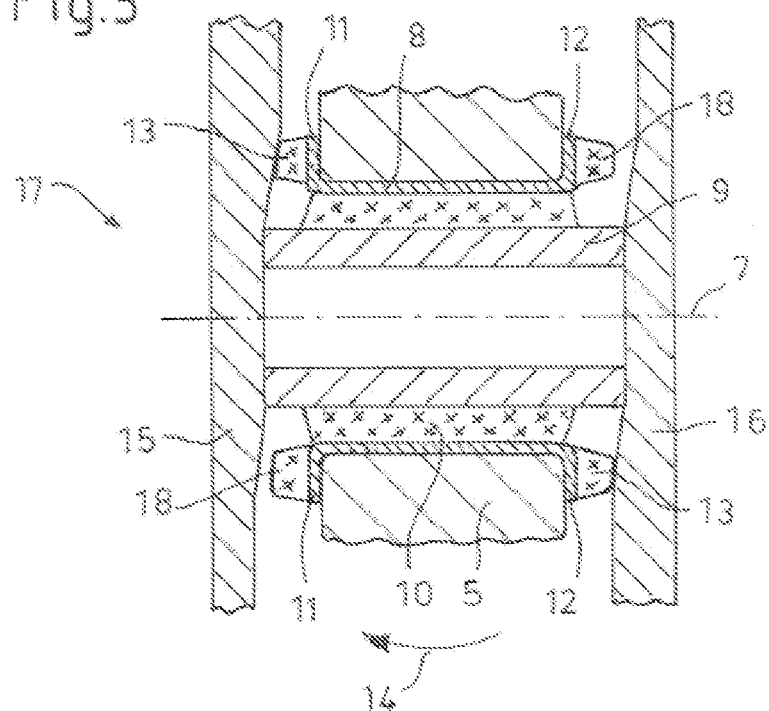
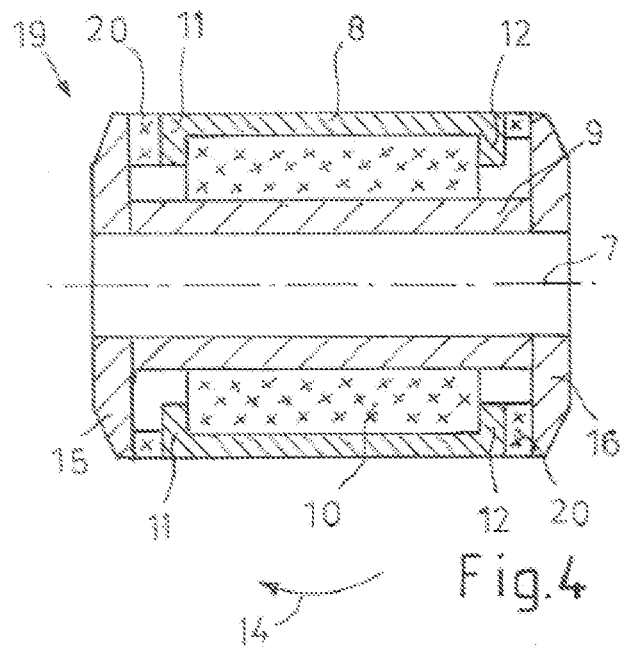
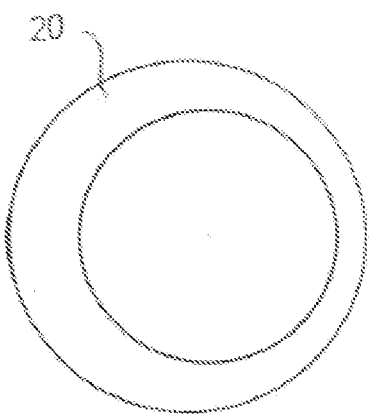

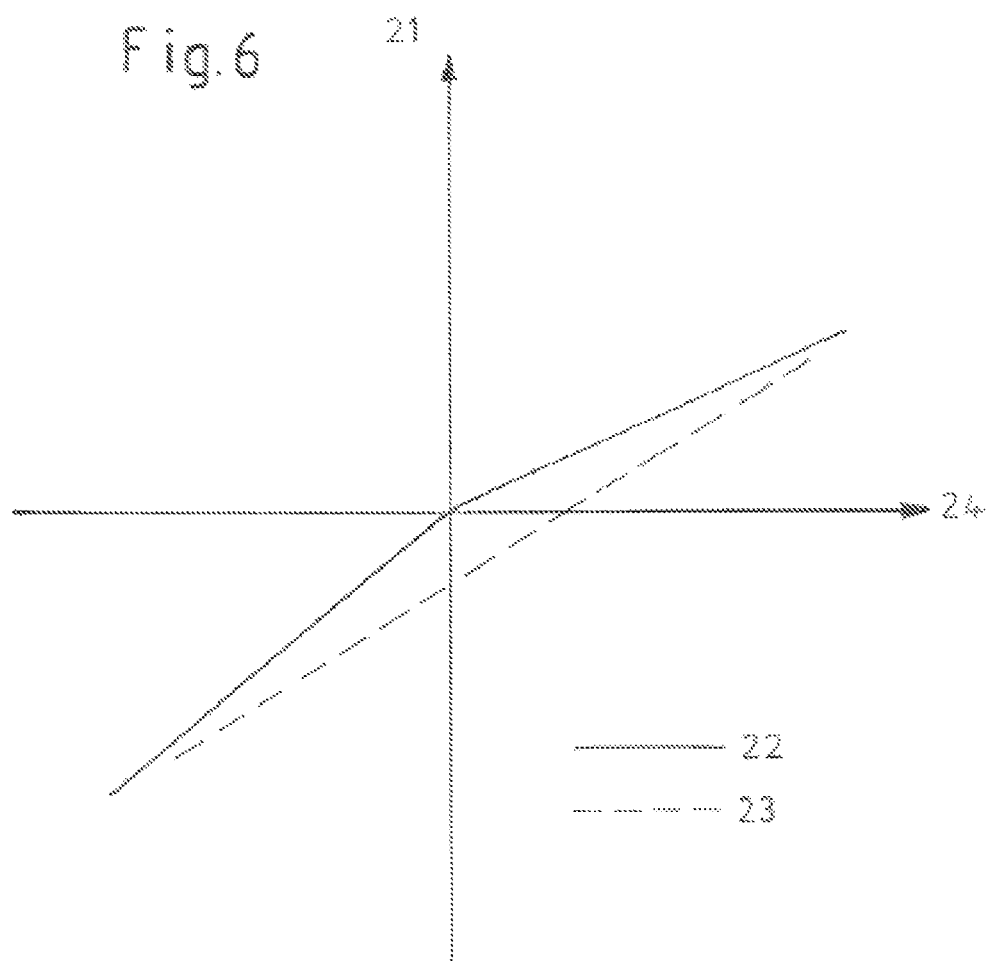

WHEEL STRUT FOR VEHICLE SUSPENSION

CROSS-REFERENCE TO RELATED APPLICATION(S)

This application claims priority to German Patent Application No. DE 102012200001.1 titled "Rubber metal bearing for motor vehicle suspension, trapezoidal strut and wheel suspension" filed Jan. 2, 2012, which is hereby incorporated by reference in its entirety.

TECHNICAL FIELD

The present disclosure relates to rubber metal bearings for a wheel suspension of a motor vehicle.

BACKGROUND

Rubber metal bearings come in many different forms and are used in different technical fields when a first component is pivotably fastened to a second component and, at the same time, the transmission of loads or noise caused thereby is to be avoided. Rubber metal bearings can be used as guide joints on axle suspensions and wheel suspensions of motor vehicles. Rubber metal bearings are generally required to carry out the pivoting movements of the wheel guiding members and to absorb the vibrations produced on the axle suspension and/or wheel suspension.

Rubber metal bearings can be used in steering applications as well. For example, in order to counteract a tendency to over steer, it is known to use rubber metal bearings of variable flexibility for the linkage on the vehicle body side.

It is still desirable, however, to have a rubber metal bearing which is suitable for use as a connecting joint between wheel guiding struts of a wheel suspension, in particular an independent wheel suspension, of the unarticulated wheels of a motor vehicle, such that the bearing permits a specific influence of toe behavior and/or individual steering behavior of the wheel articulated by the wheel suspension.

SUMMARY

The present disclosure addresses one or more of the above-mentioned issues. Other features and/or advantages will become apparent from the description which follows.

One advantage of the present disclosure is that it provides a rubber metal bearing which is suitable for use as a connecting joint between wheel guiding struts of a wheel suspension, in particular an independent wheel suspension, of the unarticulated wheels of a motor vehicle such that the bearing permits a specific influence of the toe behavior and/or individual steering behavior of the wheel articulated by the wheel suspension under the action of the forces acting on the wheel and/or the wheel suspension during cornering or load changes.

Additionally the present disclosure teaches a trapezoidal strut and a wheel suspension, in particular an independent wheel suspension, for the unarticulated wheels of a motor vehicle, which permits a desired individual steering behavior of the vehicle wheel articulated by the trapezoidal strut and/or the wheel suspension, both during cornering and load changes, in particular during braking of the motor vehicle. The trapezoidal strut and the wheel suspension are intended to achieve improved stability of the motor vehicle as well as better reaction to steering inputs and to be able to be produced more cost-effectively.

One exemplary embodiment of the present disclosure relates to a rubber metal bearing for a wheel suspension of a motor vehicle including: an elastic rubber body arranged between an outer bushing and an inner bushing and aligned coaxially therewith and fastened thereto. The outer bushing has a front frontal surface to which at least one front elastic rubber damping element is attached and a rear frontal surface to which at least one rear elastic rubber damping element is attached. The front and rear rubber damping elements are arranged asymmetrically with respect to one another.

Another exemplary embodiment of the present disclosure relates to a trapezoidal strut for a wheel suspension of a motor vehicle, having: two connecting points on a vehicle body side for connecting to a vehicle body; two connecting points on a wheel carrier side for connecting to a wheel carrier; and a rear bearing at the wheel side carrier having an elastic rubber body arranged between an outer bushing and an inner bushing and aligned coaxially therewith and fastened thereto. The outer bushing has a front frontal surface to which at least one front elastic rubber damping element is attached and a rear frontal surface to which at least one rear elastic rubber damping element is attached. The front and rear rubber damping elements are arranged asymmetrically with respect to one another.

Another exemplary embodiment of the present disclosure relates to an independent vehicle wheel suspension for unarticulated wheels of a motor vehicle, including: a wheel carrier articulated via a wheel guiding strut to a vehicle body; and a rubber metal bearing for attaching the wheel carrier to the wheel guiding strut. The rubber metal bearing has an elastic rubber body arranged between an outer bushing and an inner bushing and aligned coaxially therewith and fastened thereto. The outer bushing has a front frontal surface to which at least one front elastic rubber damping element is attached and a rear frontal surface to which at least one rear elastic rubber damping element is attached. The front and rear rubber damping elements are arranged asymmetrically with respect to one another.

Yet another exemplary embodiment of the present disclosure relates to a vehicle suspension wheel strut, having: a first bushing; a wheel carrier journaled onto the first busing; a first bracket at a first end of the first bushing; a second bracket at a second end of the first bushing; and identical damping elements positioned between the first bracket and wheel carrier at the first end of the first bushing and the second bracket and the wheel carrier at the second end of the first bushing.

Another exemplary embodiment of the present disclosure relates to a vehicle suspension wheel strut, having a first bushing; a wheel carrier journaled onto the first busing; a first bracket at a first end of the first bushing; a second bracket at a second end of the first bushing; and damping elements arranged as a ring, positioned between the first bracket and wheel carrier at the first end of the first bushing and the second bracket and the wheel carrier at the second end of the first bushing.

The invention will be explained in greater detail below by way of example with reference to the figures, in which the same reference numbers are used in the figures for identical or essentially identical elements. The above features and advantages and other features and advantages of the present teachings are readily apparent from the following detailed description of the best modes for carrying out the invention when taken in connection with the accompanying drawings. In the figures:

BRIEF DESCRIPTION OF THE DRAWINGS

FIG. 1 is side view of a wheel guide carrier compatible with rubber metal bearings according to exemplary embodiments of the present invention.

FIGS. 2a-b are cross-sectional views of an exemplary embodiment of a rubber metal bearing.

FIG. 3 is a cross-sectional view of another exemplary embodiment of a rubber metal bearing.

FIG. 4 is a cross-sectional view of another embodiment of a rubber metal bearing.

FIG. 5 is a front view of a rubber damping element in the rubber metal bearing of FIG. 4.

FIG. 6 is a graphical illustration of torque path versus rotation for an exemplary rubber metal bearing in the toe-in and toe-out directions.

DETAILED DESCRIPTION

Referring to the drawings, wherein like characters represent examples of the same or corresponding parts throughout the several views, there are shown exemplary rubber metal bearings for a vehicle wheel guiding strut.

Illustrated examples of a rubber metal bearing, according to the invention, for a wheel suspension of a motor vehicle include an elastic rubber body arranged between an outer bushing and an inner bushing aligned coaxially therewith and fastened thereto (for example by being vulcanized thereto). The outer bushing has a front frontal surface to which at least one front elastic rubber damping element is attached and a rear frontal surface to which at least one rear elastic rubber damping element is attached. The front and rear rubber damping elements are arranged asymmetrically to one another.

According to an embodiment, in each case a plurality of front and rear rubber damping elements are arranged spaced apart from one another on the front frontal surface and on the rear frontal surface. As a result, an accurate elasticity and/or rigidity of the rubber metal bearing is specifically adapted to the desired individual steering behavior. The total elasticity and/or rigidity effective in the axial direction of the front and rear rubber damping elements can be set in a simple manner by the number of elements and the spacing thereof relative to one another.

A further simple possibility for setting the total elasticity and/or rigidity in the axial direction of the rubber damping elements arranged on a frontal surface is to provide the front and rear rubber damping elements with different lengths, widths and/or heights. Due to the variable heights of the rubber damping elements, for example, the spring constant of each individual rubber damping element that acts during compression as a spring can be set according to a current degree of compression. Such a path-dependent spring constant can also be advantageously achieved by the rubber damping elements having a conical profile. By the choice of suitable spacings of the rubber damping elements relative to one another and the lengths, widths and/or heights of the elements, the elasticity or rigidity acting in the axial direction can be varied both independent and dependent on the path, i.e. taking account of the actual degree of compression.

According to a further advantageous embodiment of the invention, the front rubber damping elements are arranged in a front peripheral portion of the front frontal surface and the rear rubber damping elements are arranged in a rear peripheral portion of the rear frontal surface. The front peripheral portion and the rear peripheral portion in each case form a maximum of half of the corresponding total frontal surface and the front peripheral portion, arranged diametrically to the rear peripheral portion. As a result, it is ensured that the rubber metal bearing, as described above, can rotate under the action of the torque by a specific angle transversely to the longitudinal axis of the bearing as, for example, the region exactly opposing the front peripheral portion (not the diametrically opposing region) of the rear frontal surface has no rubber damping elements and thus sufficient free space remains between this region of the frontal surface and a bearing bracket for a rotation of the rubber metal bearing. The rotation, however, requires a certain elastic compressibility of the rubber body in the radial direction.

For particularly simple and cost-effective manufacture, the front and rear rubber damping elements are configured integrally with the rubber body, according to one embodiment. Expediently, in this case the front and rear rubber damping elements are connected to the rubber body via a relatively narrow rubber web, so that, the damping elements can be folded over for easier insertion of the rubber body into the outer bushing.

A further advantageous embodiment of the present invention provides that the front and rear frontal surfaces are in each case of flange-like configuration and extend approximately at right-angles to the longitudinal axis of the rubber metal bearing. Thus, the front and rear frontal surfaces can be designed according to the axial forces to be received thereby when used in a wheel suspension and/or a wheel guiding strut.

The wheel suspension according to the present invention permits specific influence on the toe behavior and/or individual steering behavior of the wheel articulated by the wheel suspension, under the action of forces acting on the wheel and/or the wheel suspension during cornering or load changes. Also, excellent cornering stability is provided as well as better reaction to steering inputs produced via more cost-effective means.

FIG. 1 shows a schematic plan view of a wheel guide strut 1 according to an exemplary embodiment the invention. An installation position is illustrated by an arrow 2 in the direction of travel of a vehicle. In the exemplary embodiment shown, the wheel guide strut 1 is a torsionally rigid transverse strut and/or trapezoidal strut that has two connecting points 3 on the body side for connecting the trapezoidal strut 1 to a vehicle body or an auxiliary frame connected to the vehicle body. The connecting point 3 on the left-hand side of the body, shown in FIG. 1, is a front internal connecting point 3 viewed in the direction of travel 2, whilst the right-hand connecting point 3 represents a rear internal connecting point 3.

The wheel guiding and/or trapezoidal strut 1 also includes two connecting points 4 on the wheel carrier side, for connecting a wheel carrier 5. Similar to the connecting points 3 on the body side, the connecting points 4 on the wheel carrier side can also be differentiated as a front outer connecting point 4 on the wheel carrier side viewed in the direction of travel 2 (left connecting point 4 with respect to FIG. 1) and a rear outer connecting point 4 on the wheel carrier side (right connecting point 4 with respect to FIG. 1). In the exemplary embodiment shown in FIG. 1, at least the rear connecting point 4 on the wheel carrier side comprises a rubber metal bearing 6 as described herein. A first exemplary embodiment of the rubber metal bearing 6 is described hereinafter with reference to FIGS. 2a-b.

In FIGS. 2a-b, two cross-sectional views of a first exemplary embodiment are shown of a rubber metal bearing 6. The FIG. 2a shows a section through the rubber metal bearing 6 along its longitudinal axis 7, which coincides with an X-axis of the three coordinate axes. FIG. 2b shows the rubber metal bearing 6 in a cross-sectional view perpendicular to the X-axis and/or longitudinal axis 7 along a cutting line A-A shown in FIG. 2a.

In the longitudinal section of the rubber metal bearing 6, an outer bushing 8 and an inner bushing 9 are aligned coaxially therewith. Between the outer bushing 8 and the inner bushing 9 an elastic rubber body 10 is fastened, for example the rubber body 10 is vulcanized to the outer bushing 8 and the inner bushing 9. The outer bushing 8 includes both a front frontal surface 11 as well as a rear frontal surface 12 which, as shown in FIGS. 2a-b, are of flange-like configuration and extend substantially approximately at right-angles to the longitudinal axis 7 of the rubber metal bearing 6. As shown in FIGS. 2a-b, at least one elastic front rubber damping element 13 is attached to the front frontal surface 11 and at least one elastic rear rubber damping element 13 is also attached to the rear frontal surface 12. The front and rear rubber damping elements 13 are arranged asymmetrically relative to one another. In the first exemplary embodiment shown, the front and rear rubber damping elements 13 are arranged diametrically to one another so that the rubber metal bearing 6 on its frontal surfaces 11 and 12 has an asymmetrical construction.

In FIG. 2b a front peripheral portion of the front frontal surface 11 can be clearly seen, in which a plurality of elastic front rubber damping elements 13 are arranged. The front peripheral portion extends in the half of the front frontal surface 11 extending to the left from the Z-axis shown. The front peripheral portion extends approximately half of the entire frontal surface 11. Thus, the left-hand half of the front frontal surface 11 shown forms the front peripheral portion in which the elastic front rubber damping elements 13 are arranged. The right-hand half of the front frontal surface 11 does not contain any front rubber damping elements 13.

As shown in FIG. 2b, a total of four individual rubber damping elements 13 spaced apart from one another are arranged in the front peripheral portion of the front frontal surface 11. The damping properties, in particular the total elasticity and/or rigidity effective in the axial direction of the front rubber damping elements 13 arranged in the front peripheral portion of the front frontal surface 11, can be accurately set by the number of front rubber damping elements 13 and their spacing from one another.

The rear frontal surface 12 includes a rear peripheral portion in which the rear rubber damping elements 13 are arranged. The rear peripheral portion is arranged diametrically to the front peripheral portion. The diametric arrangement of the front peripheral portion of the front frontal surface 11 to the rear peripheral portion of the rear frontal surface 12 means that the rear frontal surface 12 has a mirror-inverted arrangement of the rubber damping elements 13 of the frontal surface 11 relative to the Z-axis. Accordingly, the rear peripheral portion of the rear frontal surface 12 in which the rubber damping elements 13 are arranged makes up approximately half of the entire rear frontal surface 12. The rear peripheral portion is arranged in FIG. 2b to the right of the Z-axis. The diametric asymmetrical arrangement is visible in FIG. 2a, in which a front rubber damping element 13 of the front frontal surface 11 is shown top left and a further rear rubber damping element 13 of the rear frontal surface 12 is shown bottom right.

As shown in FIG. 2a, the rubber damping elements 13 exhibits a conical profile. Due to the steepness of the profile flanks and the size of the cross-sectional surface of the individual rubber damping elements 13, additionally the spring constant of each individual rubber damping element 13 acting as a spring during compression can be substantially set. A desired response behavior of the rubber metal bearing 6 can be set according to axial forces. It is generally the case that the more pointed the conical shape of each individual rubber damping element 13, the lower the spring constant, in particular at the start of the compression. The lower the spring constant of the rubber damping elements 13, the more flexibly the rubber metal bearing 6 according to the invention reacts to axial forces, i.e. the smaller the torque 14 initially produced about the Z-axis by the axial force acting, for example, in the direction of travel 2, and the asymmetrical arrangement of the front and rear rubber damping elements 13.

Also as shown in FIG. 2a are a left-hand, front bearing bracket 15 viewed in the direction of travel 2, and a right-hand, rear bearing bracket 16 viewed in the direction of travel 2 of the trapezoidal strut 1 (shown in FIG. 1). By means of the bearing brackets 15, 16, the rubber metal bearing 6 is retained and fastened to the trapezoidal strut 1 in a manner, for example by means of a bolt or a screw which is inserted through the inner bushing 9 and is retained by the bearing brackets 15, 16. In the exemplary embodiment shown in FIGS. 2a-b, the front and rear rubber damping elements 13 are mounted and in an unloaded state are arranged substantially without clearance between the frontal surfaces 11, 12 and the corresponding bearing brackets 15 and/or 16. As a result, an immediate response behavior of the rubber metal bearing 6 is achieved with an alteration to the direction of the vehicle, an acceleration and/or deceleration/braking procedure.

Now turning to FIG. 3, a cross-sectional view of another exemplary rubber metal bearing 17 is shown. The rubber metal bearing 17 has at least two front rubber damping elements 13, 18 of different heights in the axial direction of the rubber metal bearing 17 are attached to the front frontal surface 11, and at least two rear rubber damping elements 13, 18 of different heights in the axial direction of the rubber metal bearing 17 attached to the rear frontal surface 12. The front and rear rubber damping elements 13 and the front and rear rubber damping elements 18 have the same height. The rubber damping elements 13 and 18 have the same height and are arranged asymmetrically to one another on the front and rear frontal faces 11 and 12. The front and rear rubber damping elements 18 have, in comparison with the front and rear rubber damping elements 13, a shorter height in the axial direction of the rubber metal bearing 17. The front and rear rubber damping elements 13 have a height such that, in the installed state of the rubber metal bearing 17, damping elements bear substantially without clearance on the respective front and rear bearing brackets 15 and/or 16. The front and rear rubber damping elements 18 have certain spacing from the corresponding bearing brackets 15 and/or 16, in the installed state of the rubber metal bearing 17. Thus, the rubber metal bearing 17 will behave in a similar manner to the rubber metal bearing 6 with the application of an axial force on the rubber metal bearing 17, i.e. rotate in the direction denoted by 14.

The variable spacing of the front and rear rubber damping elements 13, 18 from the bearing brackets 15 and 16 can alternatively or additionally also be produced by the bearing brackets 15 and 16, as indicated in FIG. 3, having different spacings from the front and rear rubber damping elements 13 and 18. To this end, the bearing brackets 15 and 16 in the region of the front and rear rubber damping elements 13 are accordingly closer to the rubber damping elements 13 than to the front and rear rubber damping elements 18, from which they have certain spacing.

Regarding FIG. 4, a cross-sectional view is shown of another exemplary embodiment of a rubber metal bearing 19. In the rubber metal bearing 19, both the front and the rear rubber damping elements 13 are configured in each case as a rubber ring 20. The rubber ring 20 has an asymmetrical axial rigidity. As may be seen in FIG. 5, in which the rubber ring 20 of the rubber metal bearing 19 of FIG. 4 is shown in front view, the asymmetrical axial rigidity in the exemplary embodiment of FIG. 4 is achieved by a width of the rubber ring not being constant along its periphery. As may be derived further from FIG. 4, the front rubber damping element 20 and the rear rubber damping element 20 of the rubber metal bearing 19 are also arranged asymmetrically with respect to one another. In FIG. 4, the front (left) rubber damping element 20 is arranged such that in FIG. 4 it has a substantially greater width at the top than at the bottom. The rear (right) rubber damping element 20 has a substantially greater width at the bottom than at the top. In this manner, the rubber metal bearing 19 behaves in a similar manner to the already-described rubber metal bearings in the presence of a force acting in the axial direction on the rubber metal bearing 19, i.e. rotation in the direction denoted by 14 will occur.

FIG. 6 shows a graphical representation for illustrating z torque path, depending on a rotation of an exemplary rubber metal bearing according to the present invention in the toe-in and toe-out directions. The abscissa 24 of the Cartesian coordinate system, the horizontal or x-axis, shown represents in a positive direction. I.e., in FIG. 6 to the right, the amount of cardanic rotation of a rubber metal bearing is effective for a toe-in movement and in the negative direction (left) the amount of cardanic rotation of the rubber metal bearing is effective for a toe-out movement. The ordinate 21, vertical or y-axis, represents the effective torque produced by the rubber metal bearing, depending on the rotation of the rubber metal bearing. As seen in FIG. 6, both the curve 22 for asymmetrical rigidity and the curve 23 for asymmetrical pretensioning provide less torque for toe-in than for toe-out. In other words, the rubber metal bearing is displaced more easily in the toe-in direction than the toe-out direction when an axial force is applied, which produces a torque on the rubber metal bearing. The curve 22 corresponds to a rubber metal bearing with one respective front and rear rubber damping element that in each case have an asymmetrical axial rigidity, as has been described herein, with reference to the rubber metal bearing 19 of FIGS. 4 and 5. The curve 23 corresponds to a rubber damping element that, in addition to the asymmetrical arrangement of the front and rear rubber damping elements, is also pretensioned in the toe-in direction. This can be achieved by the front and rear rubber damping elements 13 of the rubber metal bearing 6 and/or 17 in contact with the bearing brackets 15 and 16 in the installed state already being slightly compressed and/or pretensioned by the bearing brackets 15, 16.

The rubber metal bearing according to the invention and disclosed herein, the trapezoidal strut and the wheel suspension are not limited to the embodiments disclosed herein but in each case also encompass further embodiments which act in the same manner. Thus the rubber body may also be bonded, pressed or positively inserted between the inner and outer bushings. Similarly, the rubber damping elements of a peripheral portion of the front and/or rear frontal surface can also have different lengths, widths and/or heights as well as different conical profiles or cross sections.

In an embodiment, the rubber metal bearing according to the invention is used in a trapezoidal strut having two connecting points on the vehicle body side for connecting the trapezoidal strut to a vehicle body or an auxiliary frame connected to the vehicle body and having two connecting points on the wheel carrier side for connecting a wheel carrier. The rubber metal bearing according to the invention, at least on the rear connecting point on the wheel carrier side, produces the articulated connection between the trapezoidal strut and a bearing of the wheel carrier. Such a trapezoidal strut is preferably used in an independent wheel suspension for the unarticulated wheels of a motor vehicle for connecting a wheel carrier.

The term "rubber metal bearing" does not constitute a limitation in the sense of the invention relative to an exclusive use of rubber as the rubber body and metal as the inner and outer bushing. On the contrary, the term "rubber" also encompasses any other rubber-like elastic material, for example dimensionally stable but elastically deformable plastics (elastomers). In a similar manner, the inner and/or outer bushing of the rubber metal bearing, as known per se, may be produced from a metal material but may also comprise any other material, for example plastics, provided the material is suitable for the function as the inner and outer bushings of the rubber metal bearing according to the invention.

A diametric arrangement is to be understood as an asymmetrical arrangement of the front and rear rubber damping elements, for example. Within the meaning of the present invention, "diametric" means any point of the front rubber damping element connected to a corresponding opposing point of the rear rubber damping element via a spatial diagonal. The spatial diagonal extends through the central point of the body of the rubber metal bearing. The central point of the body of the rubber metal bearing will generally correspond approximately to a center of gravity of the vehicle body.

The asymmetrical arrangement of the front and rear rubber damping elements provides a rubber metal bearing with an asymmetrical behavior where forces, in particular axial forces, act on the front and rear frontal surfaces, for example by a bearing bracket retaining the rubber metal bearing. In a conventional fastening of the rubber metal bearing, for example, to a wheel guiding strut, such as a transverse strut, the rubber metal bearing is retained by means of a fastening means which may be inserted through the inner bushing, e.g., with a bolt or screw. The bearing brackets generally define the mobility of the rubber metal bearing in the axial direction and can transmit axial forces to the front and/or rear frontal surface of the outer bushing via the corresponding front and/or rear rubber damping element.

The force acting in the axial direction and axially compressing the rubber metal bearing according to the invention in one direction thus produces a torque on the rubber metal bearing due to the asymmetrical arrangement of the front and rear rubber damping elements relative to one another, i.e. with sufficient elastic compressibility of the rubber bodies in the radial direction the torque results in a rotation of the rubber metal bearing about a spatial axis located perpendicular to the axial and/or longitudinal axis of the rubber metal bearing. This rotatability of the rubber metal bearing can be used for specific control of the toe behavior and individual steering behavior of the wheel connected to the rubber metal bearing via the wheel carrier. The asymmetrical arrangement of the front and rear rubber damping elements of the rubber metal bearing, relative to an arrangement between the wheel guiding strut and the wheel carrier, is selected such that both during cornering and load changes an adjustment of the wheel track generally takes place in the toe-in direction, in particular during braking of the motor vehicle, which generally acts in a stabilizing manner on the driving behavior of the motor vehicle.

Those familiar with the art to which this invention relates will recognize various alternative designs and embodiments for practicing the invention within the scope of the appended claims.

I claim:

1. A rubber metal bearing for a vehicle suspension comprising:
an elastic rubber body arranged between an outer bushing and an inner bushing, aligned coaxially with a vehicle direction of travel, the outer bushing having a front surface to which a front rubber damping element having a first profile is attached and a rear surface to which a rear rubber damping element having a second profile different from the first profile is attached, wherein the front and rear rubber damping elements are spaced apart from one another and are arranged asymmetrically relative to one another on the front surface and on the rear surface, respectively, such that the front and rear rubber damping elements adjust wheel tracking in a generally toe-in direction in response to an axial force.

2. The rubber metal bearing of claim 1, wherein the front rubber damping element is arranged in a front peripheral portion of the front surface and the rear rubber damping element is arranged in a rear peripheral portion of the rear surface.

3. The rubber metal bearing of claim 1, wherein the front rubber damping element has a first axial height and the rear rubber damping element has a second axial height.

4. The rubber metal bearing of claim 3, further includes:
a second front rubber damping element, having the first axial height, attached to the front surface and radially spaced apart from the front rubber damping element.

5. The rubber metal bearing of claim 4, wherein the front rubber damping element and the second front rubber damping element are both arranged on a front peripheral portion of the front surface.

6. The rubber metal bearing of claim 5, wherein the front rubber damping element and the second front rubber damping element are configured to engage a front bearing bracket.

7. A suspension link comprising:
a rubber body disposed between an inner bushing and an outer bushing, the rubber body aligned coaxially with a vehicle longitudinal axis;
a front damping element and a second front damping element disposed on a front surface of the outer bushing, wherein the front damping element engages a front bracket and the second front damping element is spaced apart from the front bracket; and
a rear damping element and a second rear damping element disposed on a rear surface of the outer bushing, wherein the rear damping element is spaced apart from a rear bracket and the second rear damping element engages the rear bracket.

8. The suspension link of claim 7 wherein the front and rear damping elements are arranged symmetrically about a lateral axis of the bearing and in response to a lateral force, the front and rear damping elements adjust wheel tracking in a generally toe-in direction.

9. The suspension link of claim 7, wherein the front damping element has a first axial height and the rear damping element has a second axial height.

10. The suspension link of claim 9, wherein the first axial height is different from the second axial height.

11. The suspension link of claim 9, wherein the first axial height is similar to the second axial height.

12. The suspension link of claim 7, wherein the front damping element is configured as a rubber ring having an asymmetrical axial rigidity.

13. The suspension link of claim 12, wherein a width of the rubber ring is not constant along a periphery of the rubber ring.

14. A wheel suspension, comprising:
a wheel carrier articulated via a wheel guiding strut to a vehicle body;
a rubber-metal bearing configured to attach the wheel carrier to the wheel guiding strut, the rubber-metal bearing having an elastic rubber body disposed between an outer bushing and an inner bushing, the rubber-metal bearing aligned coaxially with a vehicle direction of travel;
a front rubber damping element configured as a rubber ring having a varying axial thickness along a periphery of the rubber ring, the front rubber damping element disposed between a front surface of the outer bushing and a front bearing bracket, wherein the front bearing bracket has a first profile proximate the front rubber damping element; and
a rear rubber damping element configured as a rubber ring having a varying axial thickness along a periphery of the rubber ring, the rear rubber damping element disposed between a rear surface of the outer bushing and a rear bearing bracket, wherein the rear bearing bracket has a second profile proximate the rear rubber damping element, such that the front rubber damping element engages the front bearing bracket and the rear rubber damping element is spaced apart from the rear bearing bracket, the front and rear rubber damping elements adjust wheel tracking in a generally toe-in direction in response to an axial force applied to the wheel carrier.

15. The wheel suspension of claim 14, wherein the wheel guiding strut in conjunction with the rubber-metal bearing is configured to adjust vehicle cornering stability in response to the axial force.

16. The wheel suspension of claim 14, wherein the front rubber damping element and the rear rubber damping element have an asymmetrical axial rigidity.

17. The wheel suspension of claim 16, wherein a width of the rubber ring is not constant along a periphery of the rubber ring.

* * * * *